United States Patent
Lee et al.

(10) Patent No.: US 11,500,419 B1
(45) Date of Patent: Nov. 15, 2022

(54) STANDS FOR ELECTRONIC DEVICES

(71) Applicant: HEWLETT-PACKARD DEVELOPMENT COMPANY, L.P., Spring, TX (US)

(72) Inventors: Ilchan Lee, Spring, TX (US); Jin Cherl Kwon, Spring, TX (US); Jaekyu Jung, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/328,856

(22) Filed: May 24, 2021

(51) Int. Cl.
*G06F 1/16* (2006.01)
*H04M 1/04* (2006.01)
*H04B 1/3877* (2015.01)

(52) U.S. Cl.
CPC .......... *G06F 1/1632* (2013.01); *G06F 1/1686* (2013.01); *G06F 1/1688* (2013.01); *H04B 1/3877* (2013.01); *H04M 1/04* (2013.01)

(58) Field of Classification Search
CPC .................................................. G06F 1/1632
See application file for complete search history.

(56) References Cited

U.S. PATENT DOCUMENTS

| | | | |
|---|---|---|---|
| 6,587,151 B1 * | 7/2003 | Cipolla ................. | G06F 1/1607 |
| | | | D16/202 |
| 6,666,563 B2 * | 12/2003 | Brown ..................... | B60Q 3/88 |
| | | | 362/555 |
| 7,425,080 B2 * | 9/2008 | Lin ...................... | F21V 33/0052 |
| | | | 381/124 |
| 7,742,293 B2 * | 6/2010 | Strauser .................. | H04M 1/04 |
| | | | 361/679.41 |
| 8,432,667 B2 * | 4/2013 | Strauser ................ | H02J 7/0044 |
| | | | 361/679.01 |
| 8,498,100 B1 * | 7/2013 | Whitt, III ............. | H05K 5/0226 |
| | | | 361/679.28 |
| 8,611,076 B2 | 12/2013 | Wetzel et al. | |
| 8,783,936 B2 * | 7/2014 | Chien ................. | F21V 33/0024 |
| | | | 362/641 |
| 8,899,797 B2 * | 12/2014 | Schaak .................. | B42D 17/00 |
| | | | 362/410 |
| 8,913,776 B2 * | 12/2014 | Maezawa ............... | H04R 1/345 |
| | | | 381/334 |
| 9,075,572 B2 * | 7/2015 | Ayoub .................. | G06F 1/1632 |
| 9,450,632 B1 * | 9/2016 | McElroy .............. | H04B 1/3877 |
| D774,692 S  * | 12/2016 | Akkad ........................ | D26/142 |
| 9,628,597 B1 * | 4/2017 | Andersen .......... | H04M 1/72409 |
| 9,672,400 B2 * | 6/2017 | Kowalczyk ........ | G06K 7/10831 |
| 9,684,337 B2 * | 6/2017 | Jones, II ............. | F16M 11/041 |
| 9,820,024 B1 * | 11/2017 | Rolf ..................... | F21V 33/0056 |
| 9,845,912 B2 * | 12/2017 | Phillips .................. | F16M 11/04 |

(Continued)

FOREIGN PATENT DOCUMENTS

| | | |
|---|---|---|
| CN | 103988143 A | 8/2014 |
| CN | 107642661 A | 1/2018 |
| WO | WO-2020246966 A1 | 12/2020 |

*Primary Examiner* — Adrian S Wilson
(74) *Attorney, Agent, or Firm* — Conley Rose PC

(57) ABSTRACT

An example stand for an electronic device, includes a base, a column extending upward from the base, and an interface coupled to the column to engage with the electronic device to suspend the electronic device from the column. In addition, the stand includes a ringed light array coupled to the column that includes an outer diameter that is larger than the larger of a width and a length of the interface.

15 Claims, 7 Drawing Sheets

(56) References Cited

U.S. PATENT DOCUMENTS

| | | | | |
|---|---|---|---|---|
| D819,261 S * | 5/2018 | Akkad | | D26/142 |
| 10,187,558 B2 | 1/2019 | Rolston | | |
| 10,402,142 B2 * | 9/2019 | Shen | | H04N 1/00267 |
| 10,704,772 B2 * | 7/2020 | Rolf | | H04R 1/028 |
| 10,750,885 B2 * | 8/2020 | Hyma | | F16B 33/002 |
| 10,873,190 B2 * | 12/2020 | Chien | | H01R 25/006 |
| 11,058,366 B2 * | 7/2021 | Eslava | | G16H 40/63 |
| 11,271,408 B2 * | 3/2022 | Chien | | F21V 33/0004 |
| 2001/0013890 A1 * | 8/2001 | Narayanaswami | | H04N 5/2251 348/E5.025 |
| 2006/0209530 A1 * | 9/2006 | Schaak | | G11B 33/06 362/86 |
| 2008/0091250 A1 * | 4/2008 | Powell | | H05B 45/20 607/90 |
| 2009/0309964 A1 * | 12/2009 | Schrage | | H04N 5/772 348/82 |
| 2011/0227853 A1 * | 9/2011 | Warungu | | G06Q 30/0603 345/173 |
| 2012/0140970 A1 * | 6/2012 | Kim | | H04R 5/02 381/340 |
| 2012/0309462 A1 | 12/2012 | Micev | | |
| 2015/0227267 A1 * | 8/2015 | Jarema, III | | F16M 11/00 715/719 |
| 2016/0012269 A1 * | 1/2016 | Kowalczyk | | G06K 7/10742 235/462.21 |
| 2016/0153650 A1 * | 6/2016 | Chien | | F21V 33/0004 362/253 |
| 2016/0215926 A1 | 7/2016 | Pollex | | |
| 2017/0235986 A1 * | 8/2017 | Kowalczyk | | G06K 7/10881 235/462.21 |
| 2019/0122009 A1 * | 4/2019 | Sedon | | E05B 73/0082 |
| 2019/0267825 A1 * | 8/2019 | Chien | | H01R 13/6691 |
| 2020/0387051 A1 | 12/2020 | Boesnecker | | |
| 2022/0109748 A1 * | 4/2022 | Berlin | | H04M 1/026 |

\* cited by examiner

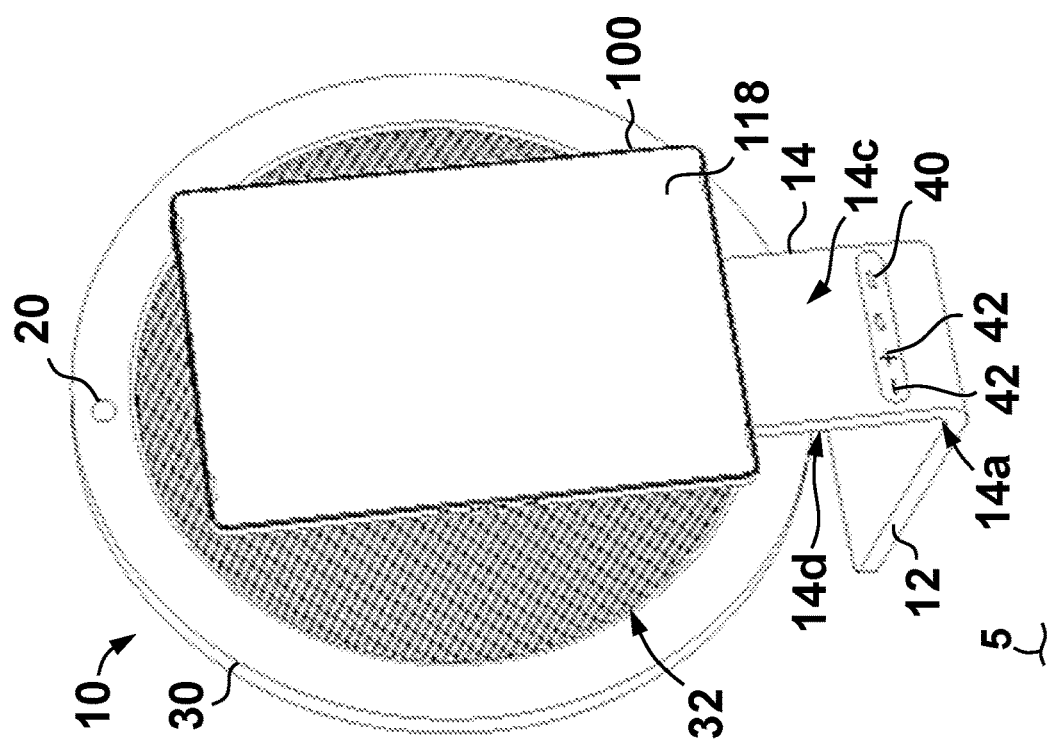
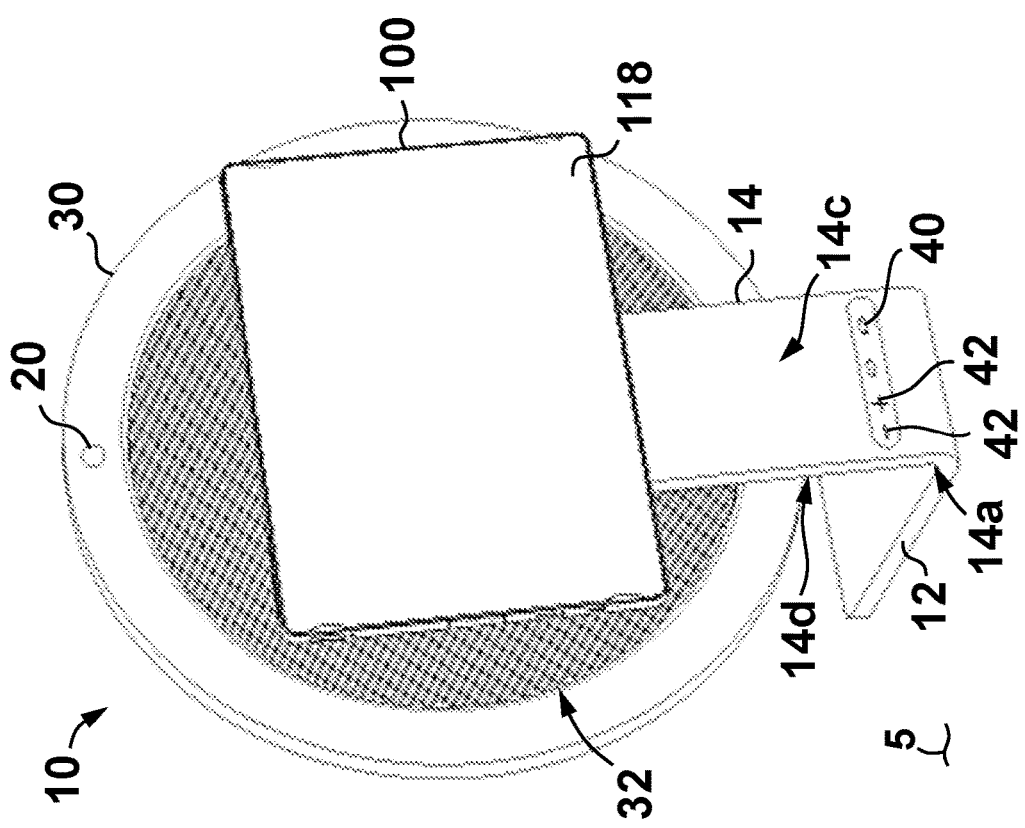

STANDS FOR ELECTRONIC DEVICES

BACKGROUND

Video conferencing has become an established mode of communication for organizations and individuals. Electronic devices (e.g., smartphones, tablet computers, desktop computers, laptop computers, all-in-one computers) may include systems and applications for conducting a video conference, such as, for instance, a display panel, a camera, a microphone, and a speaker.

BRIEF DESCRIPTION OF THE DRAWINGS

Various examples will be described below referring to the following figures:

FIGS. 1 and 2 are perspective views of a stand for an electronic device for facilitating a video conference according to some examples;

DETAILED DESCRIPTION

Electronic devices may be used to conduct video conferences. In some instances, the electronic device may be a mobile electronic device that may be readily transported from place to place. Some examples of a mobile electronic device include smartphones and tablet computers. When conducting a video conference with a mobile electronic device, a user may hold the electronic device in place or may attempt to prop up the electronic device on a wall or other structure to align the camera and/or the display panel with the user's face. In addition, depending on where a user is conducting a video conference, the available lighting may be insufficient to adequately light-up the user's face. Further, the onboard speakers of an electronic device may be small and may deliver poor sound quality during a video conference.

Accordingly, the examples disclosed herein include stands for an electronic device (e.g., a mobile electronic device) that may facilitate and enhance video conferencing utilizing the electronic device. In some examples, the example stands may be used to maintain a position of a mobile electronic device during a video conference. In addition, the example stands may include additional features, such as cameras, lights, and/or speakers for further enhancing video conferencing with the electronic device. Thus, through use of the example stands, video conferencing via an electronic device (e.g., a mobile electronic device) may be enhanced.

Figure 3:
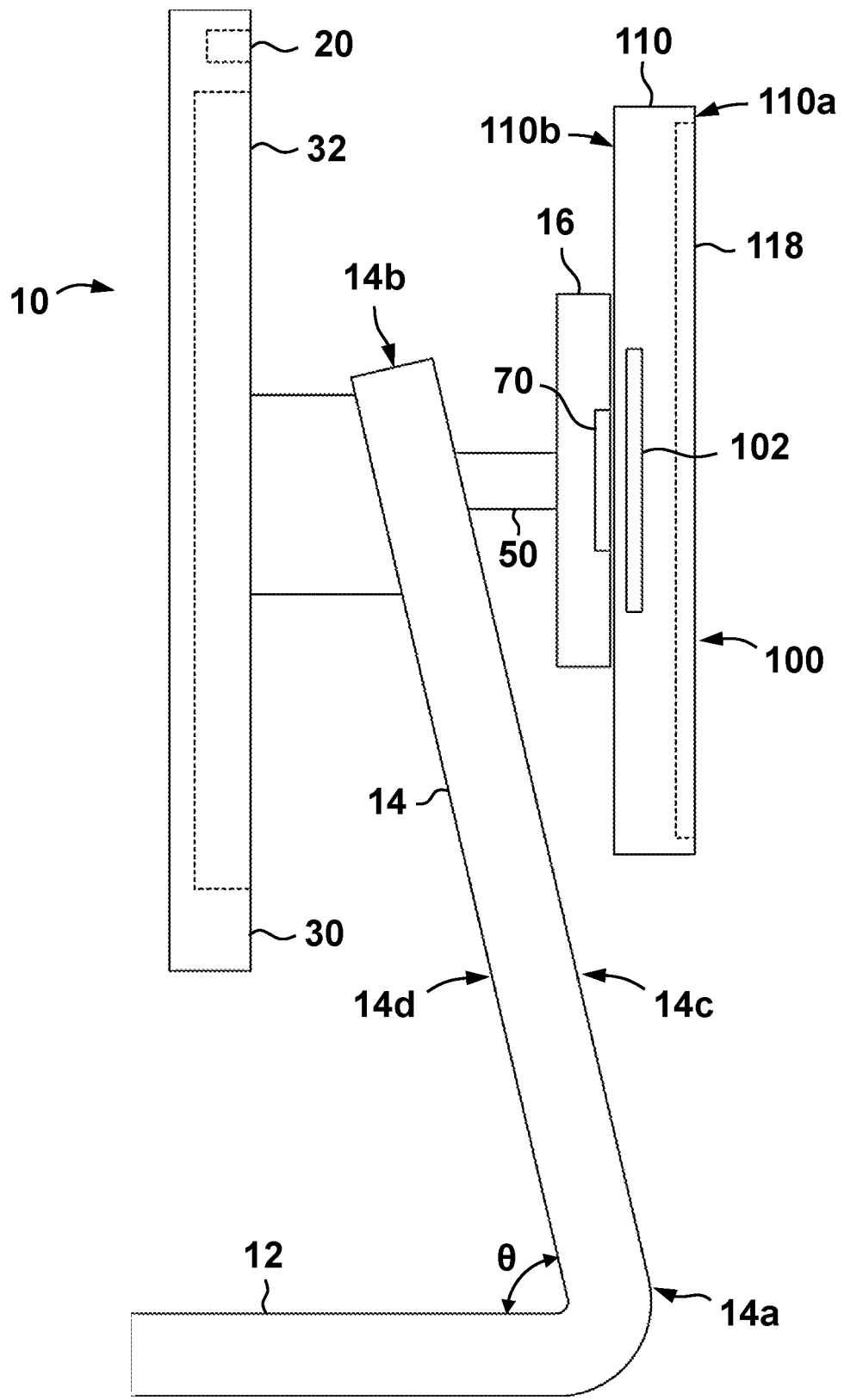
FIG. 3 is a side view of the stand of FIGS. 1 and 2 according to some examples.

Referring now to FIGS. 1-3, a stand 10 for supporting an electronic device 100, and more particularly for supporting a mobile electronic device is shown. The stand 10 includes a base 12 that may engage with a support surface 5 (e.g., the floor, a table, a countertop, a desk).

A column 14 is coupled to and extends upward from base 12. As best shown in FIG. 3, the column 14 may extend upward from base 12 at an angle θ relative to base 12. In some examples, the angle θ may be greater than 0° and less than or equal to 90°. Column 14 includes a first or upper end 14a, and a second or lower end 14b opposite upper end 14a. The column 14 is coupled to base 12 at lower end 14b, such that upper end 14a is projected away from base 12 at the angle θ. Column 14 also includes a first or front side 14c and a second or rear side 14d that is opposite front side 14c. During operations, front side 14c may generally face toward the user of the electronic device (not shown).

In some examples, the base 12 and column 14 may be formed as a single-piece monolithic body. For instance, in some examples, the base 12 and column 14 may be molded from a polymer or resin material.

Stand 10 includes an interface 16 coupled to front side 14c of column 14, between the ends 14a, 14b. As will be described in more detail below, the interface 16 is to engage with electronic device 100 such that the electronic device 100 is suspended on column 14, above the base 12 during operations.

In some examples, the connection ports 40 and/or user interface devices 42 may be positioned on front side 14c, proximate lower end 14b, such as between interface 16 and lower end 14b. However, connection ports 40 and user interface devices 42 may be positioned along rear side 14d and/or base 12 in some examples.

The connection ports 40 may comprise any suitable type for connecting with another device (e.g., an electronic device, a peripheral device such as a mouse, printer, keyboard, etc., an external hard drive, a docking station, a display panel). For instance, in some examples, connection ports 40 may comprise a universal serial bus (USB) port, a high-definition multimedia interface (HDMI) port, a video graphics array (VGA) port, an electrical power port, etc.

The user interface devices 42 may comprise any suitable device or component that may be actuated or engaged by a user to trigger an action, command, or other suitable response. For instance, in some examples, the user interface devices 42 may comprise buttons, touch sensitive surfaces, switches, etc.

Referring still to FIGS. 1-3, a ringed light array 30 and curved speaker assembly 32 are coupled to rear side 14d of column 14, opposite the interface 16. Further details of the ringed light array 30 and curved speaker assembly 32 are described below.

Referring specifically now to FIG. 3, interface 16 may be engaged with and secured to an electronic device 100 via any suitable device or mechanism. For instance, in some examples, the interface 16 may mechanically latch to a suitable connector on a housing 110 of the electronic device 100. In some examples, as shown in FIG. 3, the interface 16 may comprise a magnet (or plurality of magnets) 70 that may magnetically attract a corresponding magnetic material 102 positioned on or within the housing 110 of electronic device 100. The magnet (or magnets) 70 may comprise electromagnets or permanent magnets. In some examples, the electronic device 100 comprises a tablet computer or smartphone, such that the housing 110 has a front side 110a supporting a display panel 118 and a rear side 110b that is opposite the front side 110a. The magnetic material 102 may be positioned on, along, or under the rear side 110b such that when the electronic device 100 is engaged with the interface 16, the display panel 118 may face outward or away from front side 14c of column 14. The magnetic material 102 may comprise any material that may experience a force due to the presence of a magnetic field. In some examples, the magnetic material 102 may comprise a magnet (e.g., permanent magnet, electromagnet) and/or a ferromagnetic material (e.g., iron), etc.

Figure 4:
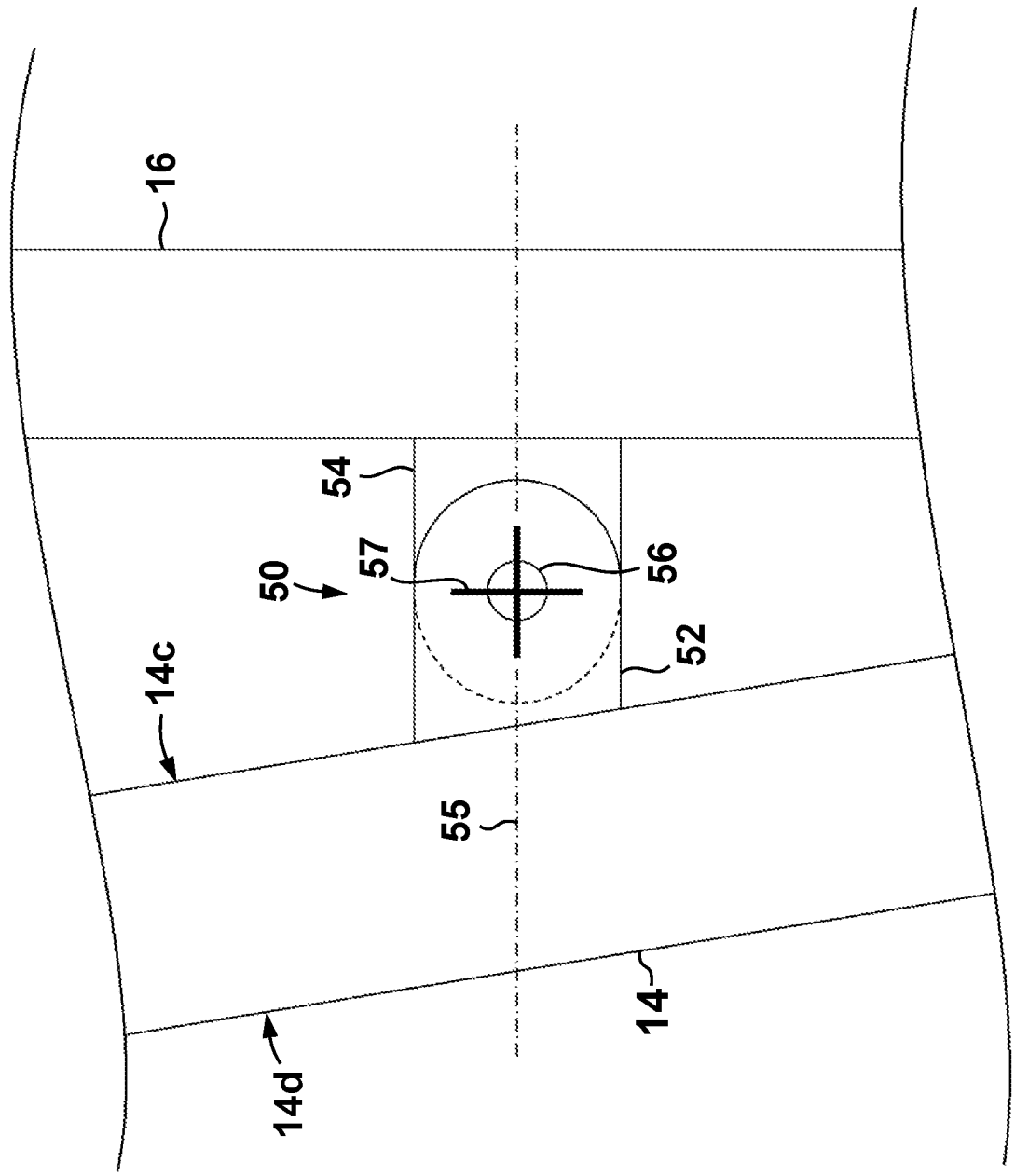
FIG. 4 is an enlarged, side view of a coupling between a column and interface of the stand of FIGS. 1 and 2 according to some examples.

Referring now to FIG. 4, interface 16 is pivotably coupled to front side 14c of column 14 via a pivotable coupling assembly 50. In some examples, the pivotable coupling assembly 50 may include a pinned connection that comprises a first post 52 coupled to front side 14c of column 14 and a second post 54 coupled to interface 16. The first post 52 may be coupled to the second post 54 with a pin 56.

During operations, the pivotable coupling assembly 50 may facilitate pivoting of the interface 16 relative to the column 14 about a pair of orthogonal axes of rotation 55 and 57. In particular, a tilt of the interface 16 (and thus a tilt of electronic device 100 coupled to interface 16) may be adjusted by rotating the second post 54 about an axis of rotation 57 relative to the first post 52, via the pin 56.

In addition, the interface 16 may be rotated about an axis of rotation 55 that is orthogonal to the axis of rotation 57. In particular, in some examples, the second post 54 may be pivotably coupled to interface 16 so that interface 16 may be pivoted relative to second post 54 about axis of rotation 55. In some examples, a bearing or other suitable structure or device (not shown) may be coupled between the second post 54 and interface 16 to facilitate the relative rotation of interface 16 and second post 54. Referring briefly again to FIGS. 1-3, during operations, the pivotable coupling assembly 50 may allow interface 16 to be pivoted about axis of rotation 55 to selectively place the electronic device 100 coupled to interface 16 in a landscape orientation (FIG. 1) and a portrait orientation (FIG. 2).

Figure 5:
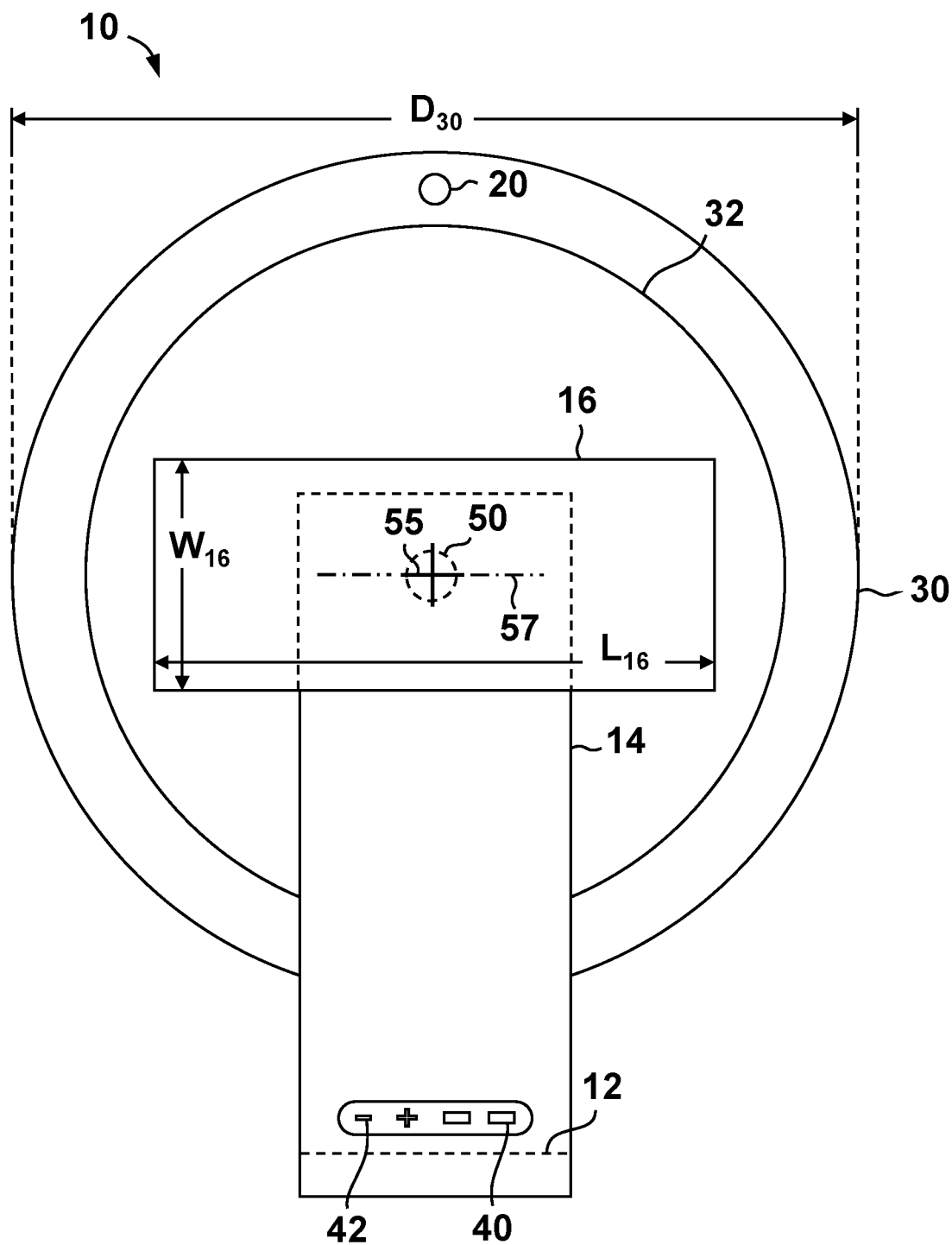
FIG. 5 is a front view of the stand of FIGS. 1 and 2 with the electronic device removed and detailing the relative size of an interface and ringed light array according to some examples.

Referring now to FIGS. 3 and 5, the ringed light array 30 may be circular in shape and extend about an outer periphery of the interface 16 and electronic device 100 (when engaged with the interface 16). The ringed light array 30 may include a plurality of light emitting devices, such as, for instance, light emitting diodes (LEDs) that may emit light outward from the ringed light array 30 toward a user positioned in front of the front side 14c of column 14. In addition, the ringed light array 30 may comprise lenses, reflectors, diffusers, etc. for directing, softening, concentrating, etc. the light that is emitted from the light emitting devices during operations.

As best shown in FIG. 5, the ringed light array 30 may include an outer diameter $D_{30}$ that is larger than the largest dimension of the interface 16. For instance, the interface 16 may be a generally rectangular member that includes a length $L_{16}$ and a width $W_{16}$ that is perpendicular to the length $L_{16}$. Accordingly, the outer diameter $D_{30}$ of the ringed light array 30 may be larger than the larger of the width $W_{16}$ and length $L_{16}$ of the interface 16.

Referring again to FIGS. 1, 2, and 5, in some examples stand 10 includes a camera 20 coupled to ringed light array 30 and curved speaker assembly 32. The camera 20 may be positioned along the ringed light array 30 above the interface 16 and the electronic device 100 (e.g., when the electronic device 100 is engaged with the interface 16). The camera 20 may be of a generally higher quality than cameras that are normally installed within an electronic device 100 (e.g., such as the user-facing camera in a smartphone or tablet computer).

Figure 6:
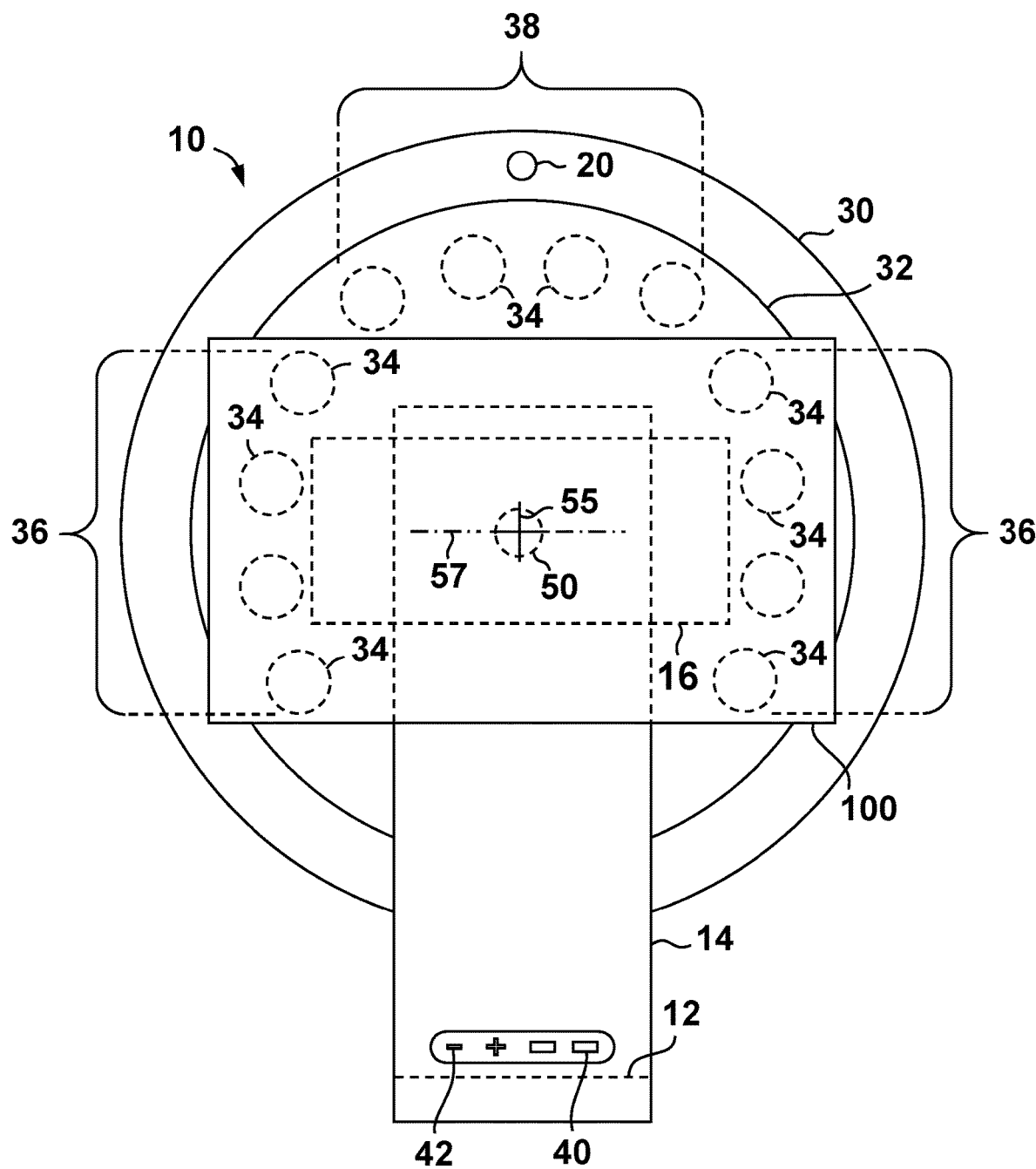
FIGS. 6 and 7 are front views of the stand of FIGS. 1 and 2 showing a plurality of speaker drivers of a speaker assembly and with the electronic device in a landscape orientation and portrait orientation, respectively, according to some examples.
Figure 7:
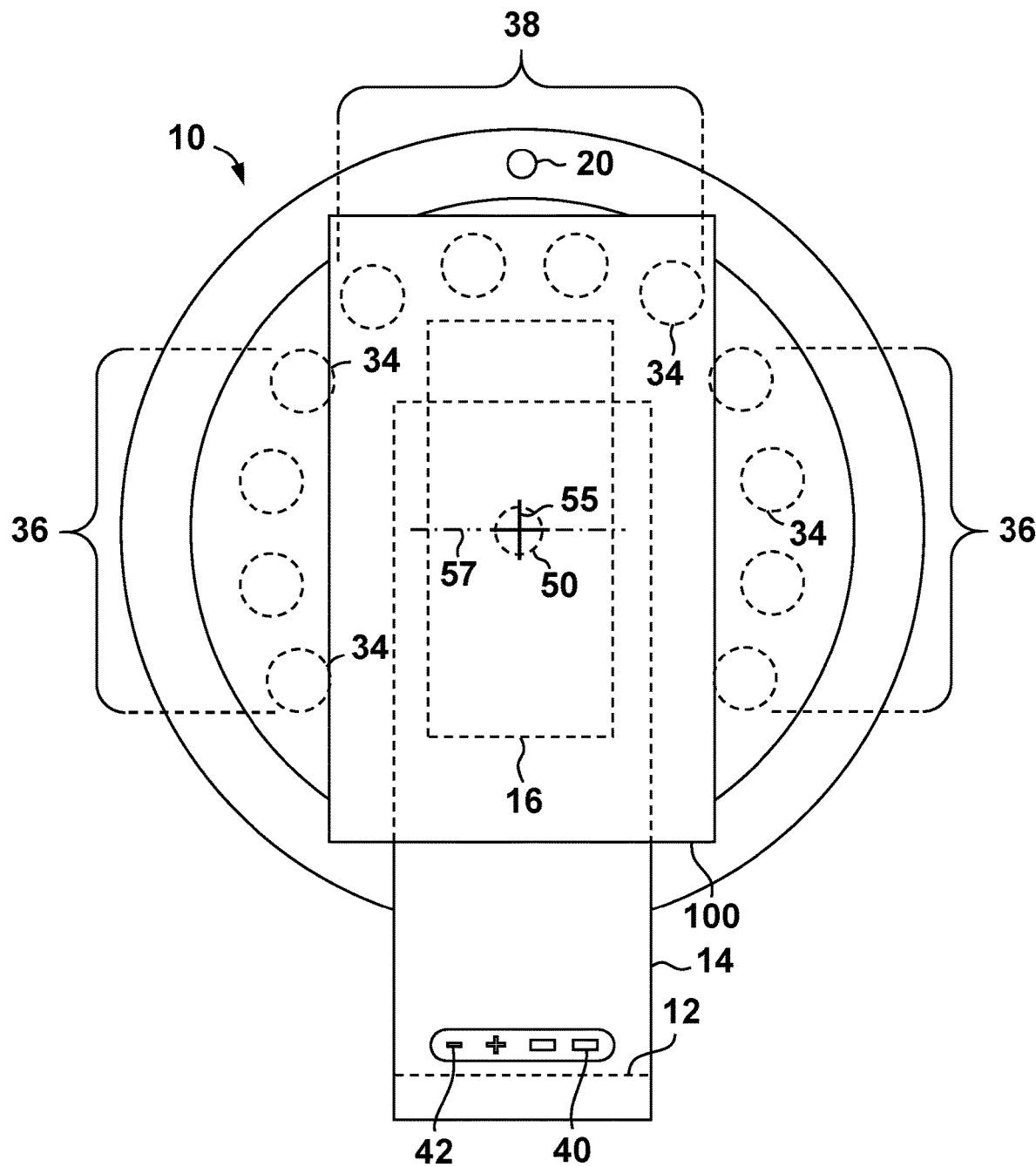

Referring now to FIGS. 6 and 7, the curved speaker assembly 32 may be round or circular in shape and may be coupled to the ringed light array 30. In particular, the ringed light array 30 may be arranged about a periphery of the curved speaker assembly 32. The curved speaker assembly 32 (or more simply "speaker assembly 32") may comprise a plurality of speaker drivers 34. Each speaker driver 34 may comprise a speaker cone and magnet assembly for producing sound waves. The plurality of speaker drivers 34 may comprise a first set 36 and a second set 38. As best shown in FIG. 6, the second set 38 of the plurality of speaker drivers 34 may be blocked or occluded (e.g., based on a view of a user toward the front side 14c of column 14) by the electronic device 100 when the electronic device 100 is pivoted about axis of rotation 55 to a first orientation relative to column 14. The first orientation of FIG. 6 may comprise a landscape orientation for the electronic device 100 (and particularly for the display panel 118 shown in FIGS. 1 and 2). As best shown in FIG. 7, the second set 38 of the plurality of speaker drivers 34 may be blocked or occluded (e.g., based on a view of a user toward the front side 14c of column 14) by the electronic device 100 when the electronic device 100 is pivoted about axis of rotation 55 to a second orientation relative to column 14. The second orientation of FIG. 7 may comprise a portrait orientation for the electronic device 100 (and particularly for the display panel 118 shown in FIGS. 1 and 2). Thus, the second orientation of the electronic device 100 may be rotated about 90° from the first orientation about the axis of rotation 55.

As will be described in more detail below, during operations, speaker drivers 34 that are blocked or occluded by the electronic device 100 (e.g., based on a view of the user toward the front side 14c of column 14) may be deactivated as sound emitted from these speaker drivers 34 may be muffled or reflected. Conversely, speaker drivers 34 that are not blocked by the electronic device 100 may offer a higher sound output quality for a user, and thus may be activated. For instance, in some examples the first set 36 of the plurality of speaker drivers 34 may be deactivated and the second set 38 of the plurality of speaker drivers 34 may be activated when the electronic device 100 is rotated about the axis of rotation 55 to the first orientation (e.g., the landscape orientation) of FIG. 6. Likewise, during operations, the second set 38 of the plurality of speaker drivers 34 may be deactivated and the first set 36 of the plurality of speaker drivers 34 may be activated when the electronic device 100 is rotated about the axis of rotation 55 to the second orientation (e.g., the portrait orientation) of FIG. 7.

Referring again to FIGS. 1-3, during operations, when a user is conducting a video conference with the electronic device 100, the user may engage the electronic device 100 with the interface 16 so as to suspend the electronic device 100 from column 14 as previously described. The user may position the electronic device 100 in a selected orientation and position on column 14 via rotation of the interface 16 relative to column 14 as previously described (e.g., via pivotable coupling assembly 50 shown in FIG. 4).

In addition, while conducting the video conference using electronic device 100 supported on stand 10, the user may activate camera 20 to capture images so that others participating in the video conference may see the user. As previously described, the camera 20 may be of higher quality than a user-facing camera (not shown) within the electronic device 100 so that the user's video feed and/or images may be enhanced (e.g., clearer, sharper, smoother).

Further, while conducting the video conference using electronic device 100 supported on stand 10, the user may activate the ringed light array 30 to light-up the user so that the user is clearly visible in the images/video captured by the camera 20. Also, the plurality of speaker drivers 34 (or one of the sets 36, 38 of the speaker drivers 34) may output a sound signal of the video conference.

Figure 8:
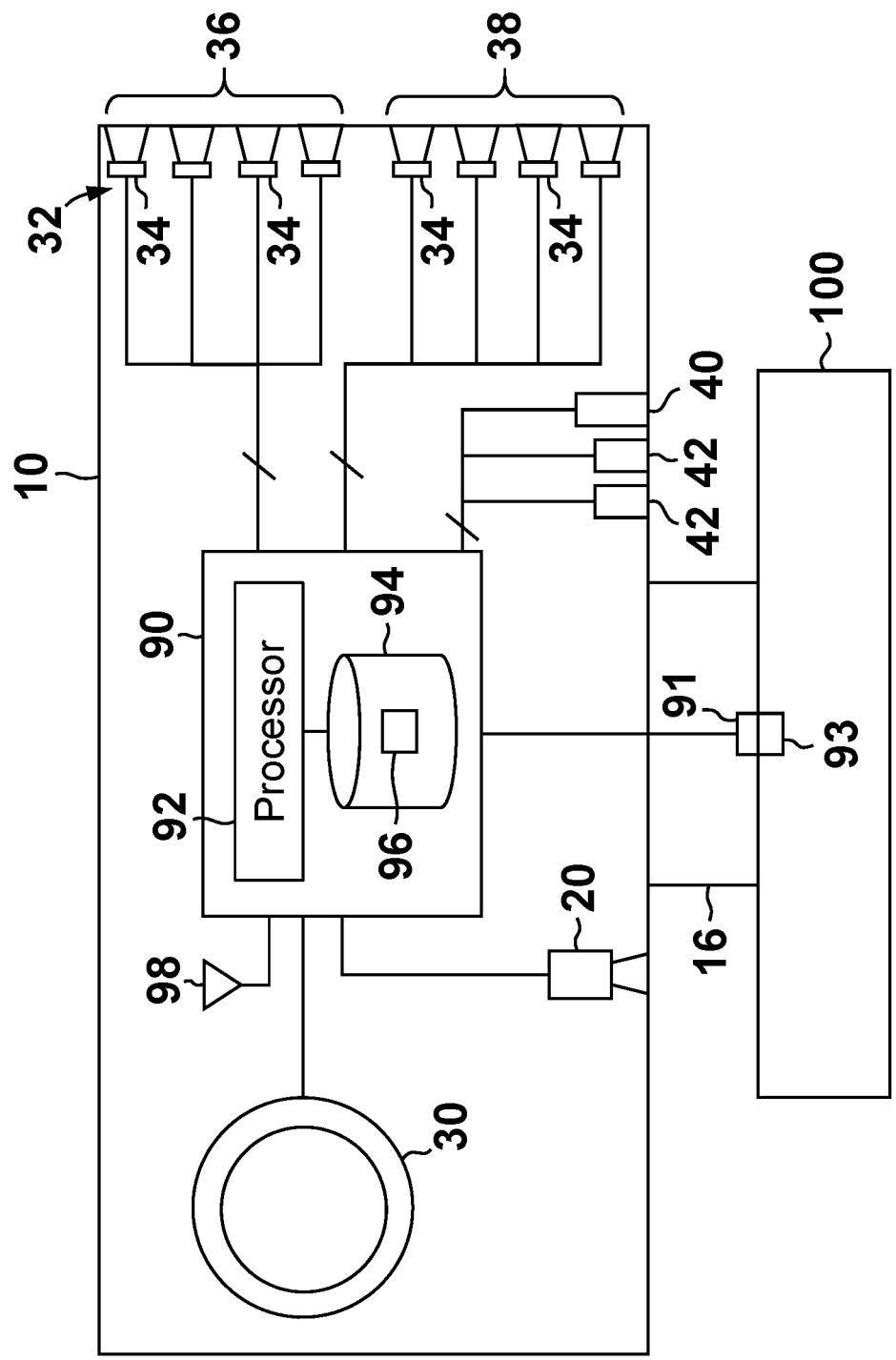
FIG. 8 is a system diagram of the stand of FIG. 1 and an electronic device coupled thereto according to some examples.

Referring now to FIG. 8, in some examples, stand 10 may include a controller 90 that is to control various functionalities and components of stand 10 during operations. Controller 90 may include a processor 92 and a memory 94.

The processor 92 may comprise any suitable processing device, such as a microcontroller, central processing unit (CPU), graphics processing unit (GPU), timing controller (TCON), scaler unit. The processor 92 executes machine-readable instructions (e.g., machine-readable instructions 96) stored on memory 94, thereby causing the processor 92 to perform some or all of the actions attributed herein to the processor 92. In general, processor 92 fetches, decodes, and executes instructions (e.g., machine-readable instructions 96). In addition, processor 92 may also perform other actions, such as, making determinations, detecting conditions or values, etc., and communicating signals. If processor 92 assists another component in performing a function, then processor 92 may be said to cause the component to perform the function.

The memory 94 may comprise volatile storage (e.g., random access memory (RAM)), non-volatile storage (e.g., flash storage, etc.), or combinations of both volatile and non-volatile storage. Data read or written by the processor 92 when executing machine-readable instructions 96 can also be stored on memory 94. Memory 94 may comprise "non-transitory machine-readable medium," where the term "non-transitory" does not encompass transitory propagating signals.

The processor 92 may comprise one processing device or a plurality of processing devices that are distributed within stand 10. Likewise, the memory 94 may comprise one memory device or a plurality of memory devices that are distributed within the stand 10.

The controller 90 may be coupled to the electronic device 100 when the electronic device 100 is engaged with the interface 16. In some examples, controller 90 may be communicatively coupled to electronic device 100 via a wireless connection through an antenna 98. The wireless connection established via antenna 98 may comprise any suitable wireless communication technique or protocol (e.g., WIFI, radiofrequency communication, BLUETOOTH®, nearfield communication, infrared communication). In some examples, the wireless connection between controller 90 and electronic device 100 (e.g., via antenna 98) may be established upon engaging the electronic device 100 with interface 16. For instance, a magnetic sensor (e.g., Hall-effect sensor) may be coupled to interface 16 that may be used by controller 90 to determine when electronic device 100 is engaged with interface 16 so that a connection routine to establish a wireless connection via antenna 98 may be initiated.

In some examples, controller 90 may be communicatively coupled to the electronic device 100 via a wired connection. For instance, in some examples connectors 91 and 93 on the interface 16 and electronic device 100, respectively, may engage one another when the electronic device 100 is engaged with interface 16 to enable communications therebetween.

Regardless as to whether the communications between electronic device 100 and controller 90 are accomplished via a wireless and/or wired connection, during operations, when electronic device 100 is engaged with interface 16, the electronic device 100 may be communicatively coupled to various components of stand 10 (e.g., ringed light array 30, camera 20, connection ports 40), such that power and/or information signals may be routed therebetween. For instance, when the electronic device 100 is engaged with the stand 10, the data (e.g., images) captured by camera 20 may be communicated to electronic device 100, and commands (e.g., settings changes, activation, deactivation) may be issued from the electronic device 100 to the camera 20. In some examples, other devices (e.g., keyboard, mouse, printer) that are coupled to the connection ports 40 may communicate with electronic device 100 via controller 90. In some examples, the commands for activating, deactivating, adjusting, etc. the ringed light array 30 may be routed to controller 90 via the electronic device 100. In some examples, a user may manipulate the user interface devices 42 to change settings, deactivate, activate, etc. the ringed light arrays 30, speaker assembly 32, camera 20, connection ports 40, etc.

Further, in some examples, the stand 10 may be coupled to a source of power (e.g., a wall plug) to provide electrical power for operating the various components thereof (e.g., camera 20, ringed light array 30, speaker assembly 32, connection ports 40, controller 90, antenna 98). In some examples, when electronic device 100 is coupled to the interface 16, electrical power may be routed through the stand 10 (e.g., via controller 90) to electronic device 100 to charge a battery of other power source thereof.

Still further, in some examples, the controller 90 may selectively activate and deactivate the first set 36 and second set 38 of speaker drivers 34 of the speaker assembly 32 based on a rotational orientation of the electronic device 100 (and/or interface 16) relative to the column 14 (FIGS. 1 and 2) during operations. For instance, a switch or sensor coupled to the pivotable coupling assembly 50 shown in FIG. 4 may be coupled to controller 90 so that controller 90 may determine, based on the output form the switch or sensor, whether the electronic device 100 is in the landscape orientation (FIG. 1) or portrait orientation (FIG. 2). In response, the controller 90 may selectively activate and deactivate the first set 36 and second set 38 of the plurality of speaker drivers 34 accordingly as previously described.

The examples disclosed herein include stands for an electronic device (e.g., a mobile electronic device) that may facilitate and enhance video conferencing utilizing the electronic device. As previously described, in some examples, the example stands may be used to maintain a position of a mobile electronic device during a video conference. In addition, the example stands may include additional features, such as cameras, lights, and/or additional connection ports for enhancing video conferencing with the electronic device. Thus, through use of the example stands, video conferencing via an electronic device (e.g., a mobile electronic device) may be enhanced.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A stand for an electronic device, the stand comprising:
   a base;
   a column extending upward from the base;
   an interface coupled to the column to engage with the electronic device to suspend the electronic device from the column, wherein the interface is to pivot relative to the column; and
   a ringed light array coupled to the column that includes an outer diameter that is larger than the larger of a width and a length of the interface; and
   a speaker assembly coupled to the ringed light array that is to be communicatively coupled to the electronic device when the electronic device is engaged with the interface,
   wherein the speaker assembly comprises a plurality of speaker drivers,
   wherein a first set of the plurality of speaker drivers are to be activated and a second set of the plurality of speaker drivers are to be deactivated when the interface is pivoted to a first orientation, and
   wherein the second set of the plurality of speaker drivers are to be activated and the first set of the plurality of speaker drivers are to be deactivated when the interface is pivoted to a second orientation.

2. The stand of claim 1, comprising a camera coupled to the ringed light array.

3. The stand of claim 2, wherein the camera is positioned above the electronic device when the electronic device is engaged with the interface.

4. The stand of claim 1, wherein the column and the base comprise a single-piece monolithic body.

5. The stand of claim 1, wherein the interface is coupled to a first side of the column and the ringed light array is coupled to a second side of the column that is opposite the first side.

6. A stand for an electronic device, the stand comprising:
   a base;
   a column extending upward from the base;
   an interface coupled to the column that is to engage with the electronic device to suspend the electronic device from the column, wherein the interface is to pivot relative to the column; and
   a curved speaker assembly coupled to the column on a side opposite the interface,
   wherein the speaker assembly is to be communicatively coupled to the electronic device when the electronic device is engaged with the interface,
   wherein the speaker assembly comprises a plurality of speaker drivers,
   wherein a first set of the plurality of speaker drivers are to be activated and a second set of the purity of speaker drivers are to be deactivated when the interface is pivoted to a first orientation, and
   wherein the second set of the plurality of speaker drivers are to be activated and the first set of the plurality of speaker drivers are to be deactivated when the interface is pivoted to a second orientation.

7. The stand of claim 6, wherein the speaker assembly is circular.

8. The stand of claim 6, comprising a camera coupled to the speaker assembly.

9. The stand of claim 8, wherein the camera is positioned above the electronic device when the electronic device is engaged with the interface.

10. The stand of claim 6, comprising a ringed light array coupled to and extending around the speaker assembly.

11. A stand for an electronic device, the stand comprising:
    a base;
    a column extending upward from the base;
    an interface coupled to a first side of the column to engage with the electronic device to suspend the electronic device from the column, wherein the interface is to pivot relative to the column;
    a speaker assembly coupled to a second side of the column that is opposite the first side,
    wherein the speaker assembly comprises a plurality of speaker drivers,
    wherein a first set of the plurality of speaker drivers are to be deactivated when the interface set of the plurality of speaker drivers are to be deactivated when the interface is pivoted to a first orientation, and
    wherein the second set of the plurality of speaker drivers are activated and the first set of the plurality of speaker drivers are to be deactivated when the interface is pivoted to a second orientation; and
    a ringed light array arranged about a periphery of the speaker assembly.

12. The stand of claim 11, comprising a camera positioned along the ringed light array.

13. The stand of claim 11, wherein the speaker assembly is to be coupled to the electronic device when the electronic device is engaged with the interface.

14. The stand of claim 13, wherein the column extends away from the base at an angle that is greater than 0° and less than 90°.

15. The stand of claim 13, wherein the interface comprises a magnet that is to attract a magnetic material within the electronic device.

* * * * *